Dec. 20, 1966   F. W. PARRISH   3,293,524
COUNTER E.M.F. SPEED CONTROL SYSTEM
Filed Feb. 10, 1964
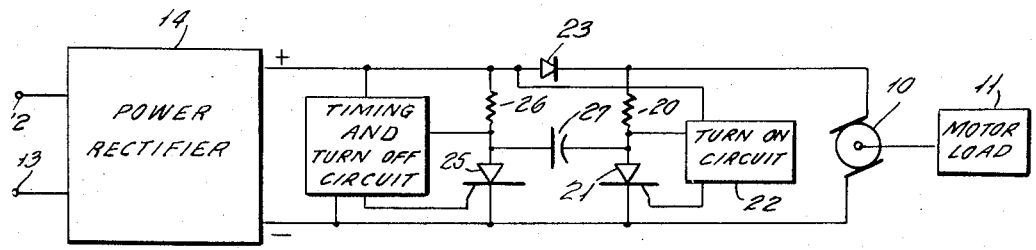
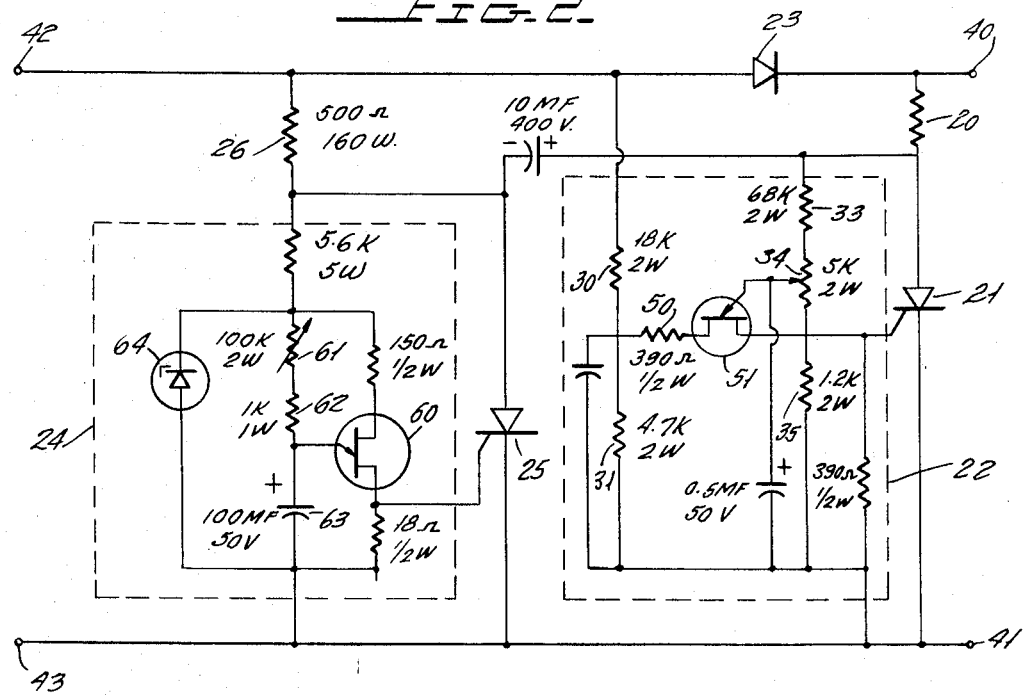
INVENTOR.
FRANK WILBERT PARRISH
BY
OSTROLENK, FABER, GERB & SOFFEN
ATTORNEYS

3,293,524
COUNTER E.M.F. SPEED CONTROL SYSTEM

Frank Wilbert Parrish, El Segundo, Calif., assignor to International Rectifier Corporation, El Segundo, Calif., a corporation of California
Filed Feb. 10, 1964, Ser. No. 343,732
3 Claims. (Cl. 318—331)

This invention relates to a novel control circuit for electrical motors, and more specifically relates to a novel control circuit for D.-C. motor power supplies which will automatically connect a resistor across the motor armature responsive to regeneration conditions.

In accordance with the present invention, a novel scheme utilizing controlled rectifiers is provided whereby a controlled rectifier which is normally non-conducting is connected in series with a resistor across the armature circuit of a D.-C. motor. The controlled rectifier is then rendered conductive or is "turned on" responsive to the motor being driven overspeed and becoming a generator with an output voltage higher than that of the power supply.

Where the main power supply is a rectifier, the power supply rectifier will offer no load to the motor acting as a generator, thus normally permitting the motor to overspeed by a large amount and at the same time generate voltage which may be high enough to cause system damage.

In accordance with the present invention, however, the controlled rectifier is automatically turned on, thus applying a resistive load across the motor terminals to absorb the over-voltage and prevent overspeeding.

As a further feature of the invention, a second controlled rectifier which is normally conductive is suitably coupled to the first controlled rectifier and is rendered non-conductive or is "turned off" as soon as the resistor is connected in the motor circuit. After some predetermined time delay, however, the second controlled rectifier is turned on automatically to turn off the first controlled rectifier so that the motor control circuit returns to its normal operating conditions.

In the event that the motor is still being driven as a generator, the protective action will again occur, this action repeating as long as necessary to prevent excessive over-voltage and speeding.

In accordance with a further feature of the invention, the novel control circuit is divided into a turn-on circuit and a timing and turn-off circuit. These two separate circuits may be mounted on their own respective modules, or supports, which offer suitable connection terminals so that installation and maintenance are considerably simplified.

Accordingly, a primary object of this invention is to provide a novel circuit for regeneration control of a D.-C. motor drive.

Another object of this invention is to prevent the regeneration of a D.-C. motor from damaging the rectifier supplying D.-C. current to the motor.

Yet a further object of this invention is to provide a novel circuit arrangement for connecting a resistor in the armature circuit of a D.-C. motor responsive to regeneration conditions, and for disconnecting this resistor after a predetermined length of time.

These and other objects of this invention will become apparent from the following description when taken in connection with the drawings, in which:

FIGURE 1 shows a schematic block diagram of the present invention.

FIGURE 2 shows a circuit diagram of the timing and turn-off circuit and turn-on circuit of FIGURE 1.

Referring first to FIGURE 1, I have illustrated therein a D.-C. motor 10 which is mechanically connected to some suitable motor load 11. The power for the armature of D.-C. motor 10 is derived from some suitable A.-C. source connected to the terminals 12 and 13 of a suitable power rectifier 14. Clearly, a multiphase A.-C. power could have been used.

The power rectifier 14 is of the type which utilizes, for example, silicon rectifier elements, and has an upper positive output terminal and a negative lower output terminal. These output terminals normally are connected directly to the motor 10.

As previously indicated, however, there are many industrial uses where it is possible and frequently occurs that the motor will be driven overspeed by its load 11 which causes the motor to become a generator with an output voltage which is higher than that of the power supply. If the power supply is of the type using rectifiers, as is the case of power rectifier 14, no load will be offered to the motor now acting as a generator so that the motor may now overspeed by any large amount, and at the same time, generate a voltage which may become high enough to cause severe damage to the motor and to the system itself.

In accordance with the present invention, a novel control circuit is provided which first senses the occurrence of a high voltage due to overspeed of the motor 10 and subsequently applies a resistive load across the motor terminals to absorb the over-voltage to prevent overspeeding. Thereafter, a second portion of the control circuit removes the resistive load after some predetermined time during which it is presumed that the motor voltage will have returned to its normal limit.

This circuit will repetitively operate in that it will connect and disconnect the resistor until such time that the motor is in fact operating in a normal manner.

In FIGURE 1 I have shown the resistor to be connected into the motor circuit as resistor 20 which is connected in series with the armature of the motor 10 and a controlled rectifier 21. The controlled rectifier 21 is then provided with a turn-on circuit 22 which is connected across an auxiliary rectifier 23 which, for example, may be in the positive lead of power rectifier 14.

The turn-on circuit 22 is of such a nature that it can sense the existence of an over-voltage at motor 10 in that it will compare the output voltage of motor 10 to the output voltage of the power rectifier 14. During overspeeding of the motor, the circuit 22 will turn on the rectifier 21 thereby inserting the resistor 20 in the armature circuit of motor 10. The resistor 20 will then serve to absorb the over-voltage from motor 10 and thus prevent overspeeding. The rating of the controlled rectifier and the value of resistor 20 will, of course, be appropriately selected for the particular motor involved.

A second circuit which is a timing and turn-off circuit 24 is then provided in accordance with the invention which cooperates with a second controlled rectifier 25 which is connected in series with a resistor 26.

A capacitor 27 is then connected between the junctions of controlled rectifiers 25 and 21 and their resistors 26 and 20 respectively.

In normal operation, the timing and turn-off circuit 24 will normally maintain controlled rectifier 25 conductive, with resistor 26 limiting the current flow through rectifier 25. However, once the controlled rectifier 21 fires responsive to overspeeding of motor 10, the capacitor 27 can discharge directly through rectifier 21 whereby controlled rectifier 25 will cease its conduction.

The timing and turn-off circuit 24 then acts in such a manner as to supply a sufficient gate bias current to rectifier 25 to return the rectifier 25 to conduction after some predetermined and adjustable period, whereupon initiation of conduction of rectifier 25 will permit discharge of capacitor 27 across rectifier 25 and removal of anode voltage from rectifier 21 so that controlled rectifier 21 is turned-off until the next occurrence of overspeeding of motor 10.

FIGURE 2 illustrates a specific embodiment for the circuit of FIGURE 1 wherein the timing and turn-off circuit is illustrated in the dotted box 24 of FIGURE 2, while the turn-on circuit is illustrated in the dotted box 22 of FIGURE 2. FIGURE 2 also shows the rectifier 23 and controlled rectifiers 25 and 21 of FIGURE 1, along with the capacitor 27 of FIGURE 1.

It will be further noted that in FIGURE 2 the various components have, immediately adjacent thereto, designations for a specific size. Thus, the resistors are given in terms of their ohmic rating and in wattage by the symbol Ω and W respectively. The symbol K indicates thousands of ohms. The capacitors are identified in terms of microfarads (mf.) and voltage (v.). The controlled rectifiers 21 and 25 are of the type 70RC40, manufactured by the International Rectifier Corporation.

These ratings have been used in a circuit where the input D.-C. voltage is 230 volts for a 10 horsepower D.-C. motor.

Referring first to the turn-on circuit 22 of FIGURE 2, the turn-on circuit includes a bridge-type of voltage comparator which includes resistors 30, 31, 32, 33, 34 and 35. Note that resistor 34 is a potentiometer. This circuit is connected across the terminals 40 and 41 and includes rectifier 23 whereby, upon an over-voltage condition, the potential between terminals 40 and 41 will differ from the input potential at terminals 42 and 43. Therefore, an unbalanced condition will occur so that current flow will pass through resistor 50 and the base circuit of unijunction transistor 51. The unijunction transistor 51 may be of the type 72-2000.

The output circuit of unijunction transistor 51 is then connected in the gate circuit of controlled rectifier 21 whereby, upon the measurement of some predetermined voltage in the voltage comparator circuit portion, the unijunction transistor 51 will cause turn-on of controlled rectifier 21. The turning on of controlled rectifier 21 will then connect the resistor 20 directly across the motor armature, thereby to absorb the over-voltage generated in the motor circuit.

As previously indicated, when controlled rectifier 21 is turned on, the capacitor 27 which is charged as indicated in FIGURE 2, may now discharge. The controlled rectifier 25 which normally conducts will now be turned off, since the discharge of capacitor 27 removes the anode voltage from rectifier 25.

The timing and turn-off circuit 24 which controls the action of controlled rectifier 25 includes therein a unijunction transistor 60 which may be of the type 72-2000 wherein the emitter voltage of transistor 60 is controlled by the series circuit which includes adjustable resistor 61, resistor 62, and capacitor 63. A suitable Zener diode 64 is connected across this circuit.

During normal operation, while controlled rectifier 25 is conducting, the timing circuit 24 is by-passed and inactive.

Immediately after controlled rectifier 21 is turned on, by regenerative voltage from the motor 10, controlled rectifier 25 is turned off. Capacitor 63 then charges at a rate established by resistors 61 and 62. When the voltage charge on capacitor 63, and the emitter of transistor 60 reaches a pre-set value, transistor 60 switches into the conducting mode. This applies a firing pulse to the gate of controlled rectifier 25, turning it on and turning off controlled rectifier 21.

Once the controlled rectifier 21 stops conducting, the resistor 20 is effectively removed from the armature circuit of motor 10 whereby the motor will operate in the normal manner. If, however, the motor is still driven overspeed, this sequence of events previously described will reoccur, this sequence reoccurring until the motor is driven in the normal manner.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. In a D.-C. motor energizing circuit; a regenerative control circuit including the series connection of a load resistor and a first controlled rectifier connected in parallel with said motor, a second controlled rectifier in parallel with said motor circuit, and a capacitor connected directly between the anodes of said first and second controlled rectifiers; and a first control circuit connected to the gate circuit of said first controlled rectifier, and a second control circuit connected to the gate circuit of said second controlled rectifier; said first control circuit including comparator circuit means connected to switching means; said switching means turning on said first controlled rectifier when switched to a conductive condition; said comparator circuit being connected to said switching means and said energizing circuit for comparing the input voltage to the motor armature voltage and rendering said switching means conductive responsive to overspeeding of said motor; said second control circuit normally supplying gate current to said second controlled rectifier for maintaining said second controlled rectifier normally conductive; said second controlled rectifier ceasing conduction responsive to turn on of said first controlled rectifier and discharge of said capacitor; said second control circuit including time delay circuit means whereby a firing gate current for said second controlled rectifier is reestablished only after a predetermined time from the turn-off of said second controlled rectifier; the subsequent turn on of said second controlled rectifier turning off conduction of said first controlled rectifier; said time delay circuit means including second switching means connected to said gate circuit of said second controlled rectifier; said switching means being normally conductive and being rendered non-conductive responsive to turn on of said first controlled rectifier.

2. The circuit of claim 1 wherein said switching means and said second switching means each comprise a unijunction transistor.

3. The circuit substantially as set forth in claim 2 wherein said first and second control circuits are mounted on first and second modules respectively.

References Cited by the Examiner

UNITED STATES PATENTS

| | | | |
|---|---|---|---|
| 3,177,417 | 4/1965 | Wright | 318—331 |
| 3,222,582 | 12/1965 | Heyman et al. | 318—345 X |
| 3,229,182 | 1/1966 | Kubler | 318—331 |

OTHER REFERENCES

G.E. SCR Manual, 2nd ed., Auburn, N.Y., 1961, pp. 62–65.

ORIS L. RADER, *Primary Examiner.*

J. C. BERENZWEIG, *Assistant Examiner.*